R. B. FAGEOL.
VEHICLE BUMPER.
APPLICATION FILED JAN. 5, 1920.
1,348,634.
Patented Aug. 3, 1920.
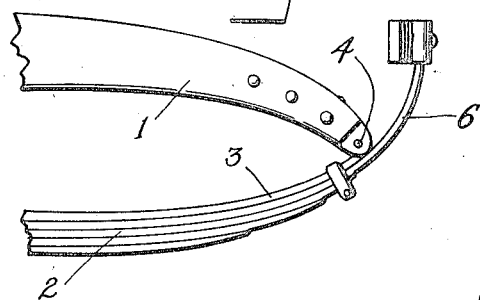
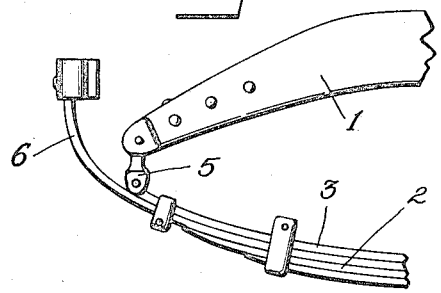
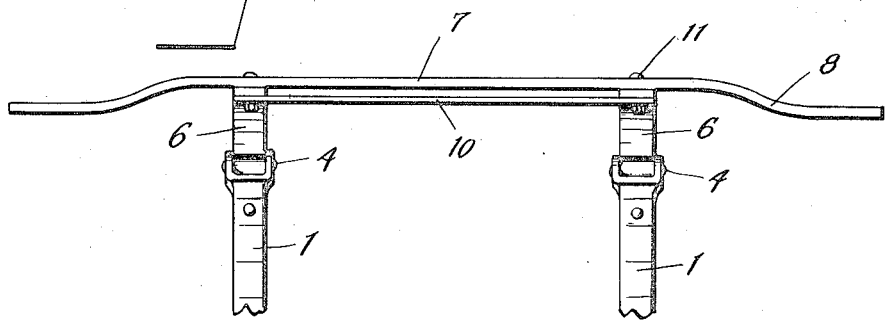
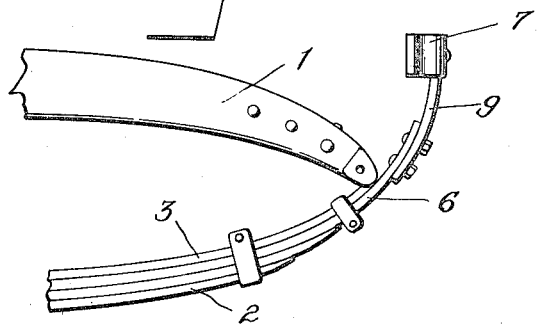
INVENTOR.
Rollin B. Fageol
BY
ATTORNEYS.

UNITED STATES PATENT OFFICE.

ROLLIE B. FAGEOL, OF OAKLAND, CALIFORNIA.

VEHICLE-BUMPER.

1,348,634.  Specification of Letters Patent.  Patented Aug. 3, 1920.

Application filed January 5, 1920. Serial No. 349,433.

*To all whom it may concern:*

Be it known that I, ROLLIE B. FAGEOL, a citizen of the United States, residing at Oakland, in the county of Alameda and State of California, have invented certain new and useful Improvements in Vehicle-Bumpers, of which the following is a specification.

Numerous constructions and arrangements have been heretofore provided for the mounting of bumper bars relative to vehicles, particularly automobiles, and the majority of said devices, as at present employed, consist in various forms of brackets, arms and the like, which are attached to the vehicle frame in various manners, and to which are secured opposing portions of the bumper bar.

The present invention relates to an improved construction or mounting for vehicle bumper bars and consists primarily in extending one or more leaves of the vehicle spring outwardly beyond the point of connection of the outer end of the vehicle spring with the vehicle frame and connecting with said extension the vehicle bumper.

By my present invention I provide a bumper support constructed of spring metal of considerable strength, and this is accomplished by extending one of the leaves or laminations of the vehicle spring to a point upwardly and beyond the end of the vehicle frame.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in side elevation of the preferred embodiment of my invention, associated with the front end of the vehicle frame.

Fig. 2 is a view similar to Fig. 1, disclosing the invention at the rear of the vehicle.

Fig. 3 is a view in plan of the preferred embodiment of my invention.

Fig. 4 is a view of the invention with the bumper carried by a bracket, which is, in turn, secured to the vehicle spring.

Referring more particularly to the drawings, wherein like characters of reference designate corresponding parts,—1 indicates the frame of an automobile or other vehicle, consisting of spaced side members, and the same is supported at its opposite ends by the conventional leaf springs 2 which extend preferably parallel with the side frame members, as illustrated in the drawings.

As in the constructions now on the market, the upper or top leaf 3 of the respective front and rear springs 2, is secured at one end directly to the vehicle frame, as at 4, this connection being at the front of the vehicle, and the rear spring is secured preferably through a link 5 to the vehicle frame, as in Fig. 2, this being preferably at the rear.

In carrying out my invention I prefer to extend one or more of the leaves of the springs 2 beyond the connection of the respective springs with the vehicle frame, and have illustrated the second leaf from the top of each spring as being extended upwardly, as at 6, beyond the end of the frame 1, the extended end 6 being curved to provide a yieldable section, and to position the outer face of the terminal end thereof in a vertical plane.

The terminal ends of the upwardly bent portion 6 of the vehicle springs at either end of the vehicle frame provide a mounting for supporting the transversely disposed bumper bar 7, illustrated as being of flat yieldable material, the terminal ends of which are slightly bent or curved as at 8, toward the vehicle frame so as to position the terminal ends of the bar 7 in close proximity to the tread of the vehicle wheels, not shown.

In Fig. 4 I have employed a curved bracket 9 secured to the terminal end of the spring extension 6 and through said bracket the bumper 7 is secured to the vehicle spring.

If desirable, a suitable truss or brace 10 may be positioned adjacent the inner face of the terminal ends of the spring extension 6, and in connecting the same providing a reinforcement for the central portion of the bar 7, this reinforcement being held in position by the same fastening means 11, which secures the bumper to the spring extension 6.

It will be apparent on pressure being applied to the bumper 7, which might cause a bending of the extensions 6, that said extensions fulcrum about the point of attachment of their respective springs to the ends of the vehicle frame.

Having thus described my invention, what I claim as new and desire to protect by Letters Patent is:—

1. In combination with a vehicle bumper disposed transversely of the vehicle, of a pair of vehicle springs each provided with an integral extension, said extensions providing a support for the bumper.

2. In combination with a vehicle bumper disposed transversely of the vehicle, of a pair of multiple leaf vehicle springs supporting the vehicle, certain leaves of said springs extending beyond the others, and providing a support for said bumper.

3. In combination with a vehicle bumper disposed transversely of a vehicle, a frame for said vehicle, a pair of multiple leaf vehicle springs supporting the vehicle with certain leaves connected with the vehicle frame, and certain other of said spring leaves extending beyond said point of connection and upwardly bent to provide a support for said vehicle bumper.

4. In combination with a vehicle bumper disposed transversely of a vehicle, of a pair of vehicle springs each provided with an integral upwardly bent extension providing a support for said bumper, and means for securing the bumper to said extension.

5. In combination with a vehicle bumper disposed transversely of a vehicle, of a pair of vehicle springs each provided with an integral upwardly bent extension providing a support for said bumper, and means for detachably securing the bumper to said extension.

6. A support for vehicle bumper bars, the same comprising an upwardly bent leaf member extending from one end of a laminated vehicle spring, the body of said leaf member constituting one of the laminations of said spring.

7. A support for a vehicle bumper bar, the same comprising a laminated spring member adapted for supporting a vehicle, one of said laminations being upwardly bent and extending beyond another of said laminations for attachment to the vehicle bumper.

In testimony whereof I have signed my name to this specification in the presence of a subscribing witness.

ROLLIE B. FAGEOL.

Witness:
   D. B. RICHARDS.